US008295545B2

(12) United States Patent
Hampapur et al.

(10) Patent No.: US 8,295,545 B2
(45) Date of Patent: Oct. 23, 2012

(54) SYSTEM AND METHOD FOR MODEL BASED PEOPLE COUNTING

(75) Inventors: Arun Hampapur, Norwalk, CT (US); Ying-li Tian, Yorktown Heights, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 12/272,122

(22) Filed: Nov. 17, 2008

(65) Prior Publication Data
US 2010/0124357 A1    May 20, 2010

(51) Int. Cl.
*G06K 9/00*    (2006.01)
(52) U.S. Cl. ..................................... 382/103; 382/209
(58) Field of Classification Search ................... 382/103
See application file for complete search history.

(56) References Cited

U.S. PATENT DOCUMENTS

| | | | | |
|---|---|---|---|---|
| 5,121,201 A * | 6/1992 | Seki | | 348/143 |
| 6,263,088 B1 | 7/2001 | Crabtree et al. | | |
| 6,633,232 B2 * | 10/2003 | Trajkovic et al. | | 340/573.1 |
| 6,967,674 B1 * | 11/2005 | Lausch | | 348/143 |
| 7,376,246 B2 | 5/2008 | Shao et al. | | |
| 7,596,241 B2 * | 9/2009 | Rittscher et al. | | 382/103 |
| 2003/0179127 A1 * | 9/2003 | Wienand | | 342/28 |
| 2004/0098298 A1 | 5/2004 | Yin | | 705/10 |
| 2004/0179736 A1 * | 9/2004 | Yin | | 382/191 |
| 2006/0269103 A1 | 11/2006 | Brown et al. | | |
| 2007/0268145 A1 | 11/2007 | Bazakos et al. | | |
| 2008/0036870 A1 | 2/2008 | Uezono | | |
| 2008/0118106 A1 | 5/2008 | Kilambi et al. | | |

OTHER PUBLICATIONS

Park et al., "Development of a block-based real-time people counting system", Aug. 2006, SSPR&SPR 2006, LNCS 4109, pp. 366-374.*
Yang, D.B. et al, "Counting People in Crowds with a Real-Time Network of Simple Image Sensors," Proceedings of the Ninth IEEE International Conference on Computer Vision (ICCV'03), Oct. 2003, pp. 1-8.
Beymer, D., "Person Counting Using Stereo," Proceedings of Workshop on Human Motion, Dec. 2000, pp. 127-133.
Terada, K. et al., "A Method of Counting the Passing People by Using the Stereo Images," Proceedings of the IEEE International Conference on Image Processing Oct. 1999, pp. 338-342.
Kettnaker, V. et al, "Counting People from Multiple Cameras," IEEE International Conference on Multimedia Computing and Systems, (Jul. 1999), vol. 2, pp. 267-271.
Cheng, J.C. et al., "Model-Based Recognition of Human Walking in Dynamic Scenes," IEEE First Workshop on Multimedia Signal Processing (Jun. 1997), pp. 268-273.

* cited by examiner

*Primary Examiner* — Tom Y Lu
(74) *Attorney, Agent, or Firm* — Anna L. Linne; Ronald A. D'Alessandro; Keohane & D'Alessandro PLLC

(57) ABSTRACT

An approach that allows for model based people counting is provided. In one embodiment, there is a generating tool configured to generate a set of person-shape models based on results of a cumulative training process; a detecting tool configured to detect persons in a camera field-of-view by using the set of person-shape models, and a counting tool configured to track detected persons upon crossing by the detected persons of a previously established virtual boundary.

16 Claims, 6 Drawing Sheets

SYSTEM AND METHOD FOR MODEL BASED PEOPLE COUNTING

FIELD OF THE INVENTION

The present invention generally relates to surveillance systems. Specifically, the present invention provides a method for model based people counting.

BACKGROUND OF THE INVENTION

Surveillance systems today provide a whole new level of pro-active control and monitoring. Network video technology not only offers superior loss prevention, but it can also be used to boost sales, improve staff and customer security, optimize store layouts, boost productivity, count people for statistical purposes, monitor flow control, and to improve many more key functions.

For instance, today's retail industry faces though challenges. Theft and inventory shrinkage are obvious causes of lost profits that are traditionally fought with surveillance systems. Also, retail surveillance offers instant benefits to businesses not only by helping to win the battle of protecting such businesses, but also by preventing crime and by making major positive contributions to planning and maximizing profits.

Unfortunately, with increased volumes of shoppers and in-store employees, theft is growing at an alarming rate. In an attempt to detect such theft, many variations of in-store surveillance systems are implemented. Data gathered by such systems is often analyzed and, based on such analysis, further actions are determined. Many of such systems will benefit greatly if such collected data is classified and formatted. For instance, there is an obvious advantage in performing automatic people counting by overhead video cameras.

There are several previously proposed and developed solutions dealing with people-counting using television technologies. Most of such solutions are based on blob tracking by overhead cameras. However, there is a well known draw back to such blob-based person tracking—it is sensitive to shadows which makes such solutions less stable and unusable for over-crowded areas.

Thus, there exist a need for providing a method and a system for accurate detection and counting of people using overhead camera views such method comprising: generating a set of person-shape models during a cumulative training process; detecting persons in a camera field-of-view by using said set of person-shape models, and counting people by tracking detected persons upon crossing by said detected persons of a previously established virtual boundary.

SUMMARY OF THE INVENTION

The current invention solves a particular problem of providing a method for accurate detection and counting of people by building an overhead person-shape model, so that people in a camera field-of-view can be accurately localized and tracked by matching such model to a target object. In turn, such person-shape model is constructed using the shape cue of a person from an overhead view. The overhead view is generally an approximated elliptical shape corresponding to a head and shoulder region of a human body.

Further, such person-shape model is unique to human bodies and therefore is impossible to confuse with other types of images to be in a camera's view such as vehicles, carts, strollers, shadows, etc. It also allows for accurate localization and tracking of people and more accurate scale determination of the detected persons—e.g., distinguishing between adults and children.

In one embodiment, there is a method for counting people using overhead camera views, such method comprising: generating a set of person-shape models during a cumulative training process; detecting persons in a camera field-of-view by using the set of person-shape models, and counting people by tracking detected persons upon crossing by the detected persons of a previously established virtual boundary.

In a second embodiment, there is a system for counting people using overhead camera views, such system comprising: at least one processing unit; memory operably associated with the at least one processing unit; a generating tool storable in memory and executable by the at least one processing unit, such generating tool configured to generate a set of person-shape models based on results of a cumulative training process; a detecting tool storable in memory and executable by the at least one processing unit, such detecting tool configured to detect persons in a camera field-of-view by using the set of person-shape models, and a counting tool storable in memory and executable by the at least one processing unit, such counting tool configured to track detected persons upon crossing by the detected persons of a previously established virtual boundary.

In a third embodiment, there is a computer-readable medium storing computer instructions, which when executed, enables a computer system to count people using overhead camera views, the computer instructions comprising: generating a set of person-shape models during a cumulative training process; detecting persons in a camera field-of-view by using the set of person-shape models, and counting people by tracking detected persons upon crossing by said detected persons of a previously established virtual boundary.

In a fourth embodiment, there is a method for deploying a counting tool for counting people using overhead camera views, such method comprising: providing a computer infrastructure operable to: generate a set of person-shape models during a cumulative training process; detect persons in a camera field-of-view by using the set of person-shape models, and count people by tracking detected persons upon crossing by the detected persons of a previously established virtual boundary.

Figure 1:
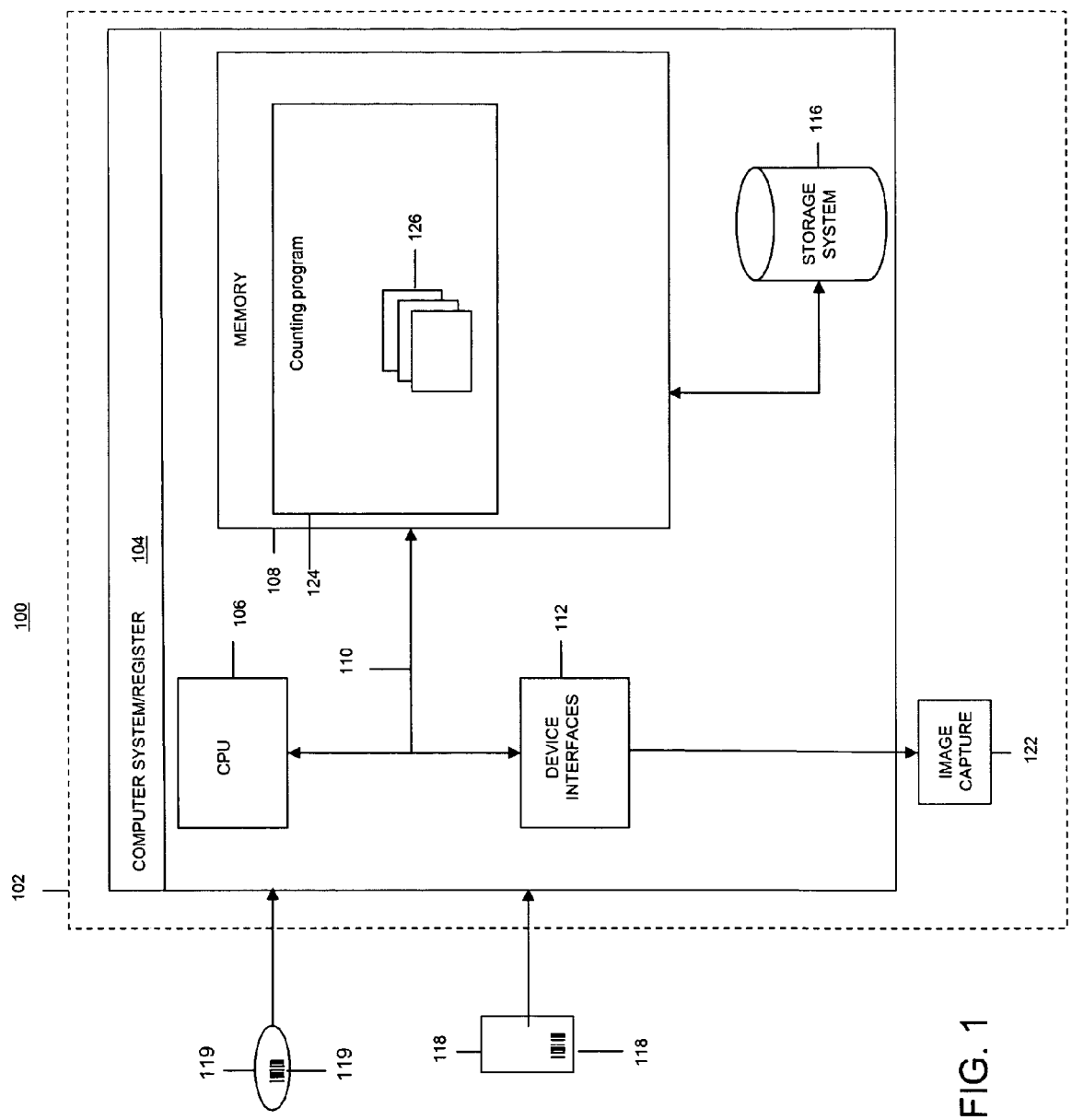
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to a method and a system for automatically counting people using overhead camera views. The framework proposed mainly consist of two parts: (1) training, which is the process of obtaining the overhead model, and (2) detection/tracking of persons, which is the process of matching the person-shape model with target object to fulfill the desired people counting process.

The training part is further described as collecting image patches containing only the head and shoulder view from different image samples. All such patches are further normalized to a uniform scale (e.g., 50×50) and gradient information such as edge, gradient orientation and gradient strength are extracted. The gradient orientations are further quantized into N dimensions.

The image patches must have the same dimension in order to build a single probabilistic map for each gradient direction. However, when life data is analyzed, persons appear in different sizes thereby creating different dimensions of input images, e.g., 320×240 pixels or 640×480 pixels. To convert such image patches into patches of the same dimension, say 50×50 pixels, there is performed an "image down/up sampling" process. More specifically, down sampling is performed to convert images to dimensions lower than its original input size, while up sampling is performed to convert images to larger dimensions. Common examples of such processes include: nearest neighbors, bi-linear interpolation, bi-cubic interpolations, simple average interpolation.

Further, a probabilistic distribution map is constructed for each direction by aggregating the magnitudes of gradients that have the same direction. For instance, for direction 1, the probabilistic map is computed by accumulating the magnitudes of those gradients that have directions between −45 and 45 degrees. At the end of the training process, a set of N probabilistic maps are obtained, hereby forming the overhead person-shape model.

In turn, the person-shape model is applied to the gradient map, including both directions and magnitudes, to obtain candidate person location for detecting people in a camera field-of-view. To reduce computational costs, background subtraction or other background modeling techniques are firstly applied to obtain potential foreground objects. The gradient features are only extracted for the foreground.

In one embodiment, there is a detection option consisting of sampling of the input image into multiple resolutions to accommodate different human sizes. Further, the N probabilistic maps of the person-shape model are convolved with the gradient map extracted from the input image. Hereby a set of confidence score if generated by such convolving of a person-shape model with each probabilistic map. Such overall detection confidence is the combination of all scores of convolving individual probabilistic maps.

In another embodiment, integral images are computed for each of the N-direction gradient maps, and the probabilistic person-shape model maps are considered as base classifiers. Further, using standard integral image processing, a set of confidence numbers are obtained for each of the probabilistic maps. To eliminate duplicate detection or, in other words, to ensure that there are no multiple detections within close areas, non-maximum suppression is performed.

Tracking of persons is performed in a 2 step fashion. First, once a person is localized at frame T, previously obtained velocity and acceleration information is used to predict its location in the frame T+1. If a person is found, then no exhaustive search is further required. Otherwise, exhaustive person detection is performed on all foreground regions, and matching with the previously tracked objects conducted using appearance models like color distributions, gradient, spatial proximity, etc. If such tracked person crosses the pre-defined virtual boundary or a virtual tripwire, the count for crossing direction is incremented.

In one embodiment, there is a method for counting people using overhead camera views, such method comprising: generating a set of person-shape models during a cumulative training process; detecting persons in a camera field-of-view by using the set of person-shape models, and counting people by tracking detected persons upon crossing by the detected persons of a previously established virtual boundary.

In a second embodiment, there is a system for counting people using overhead camera views, such system comprising: at least one processing unit; memory operably associated with the at least one processing unit; a generating tool storable in memory and executable by the at least one processing unit, such generating tool configured to generate a set of person-shape models based on results of a cumulative training process; a detecting tool storable in memory and executable by the at least one processing unit, such detecting tool configured to detect persons in a camera field-of-view by using the set of person-shape models, and a counting tool storable in memory and executable by the at least one processing unit, such counting tool configured to track detected persons upon crossing by the detected persons of a previously established virtual boundary.

In a third embodiment, there is a computer-readable medium storing computer instructions, which when executed, enables a computer system to count people using overhead camera views, the computer instructions comprising: generating a set of person-shape models during a cumulative training process; detecting persons in a camera field-of-view by using the set of person-shape models, and counting people by tracking detected persons upon crossing by said detected persons of a previously established virtual boundary.

In a fourth embodiment, there is a method for deploying a counting tool for counting people using overhead camera views, such method comprising: providing a computer infrastructure operable to: generate a set of person-shape models during a cumulative training process; detect persons in a camera field-of-view by using the set of person-shape models, and count people by tracking detected persons upon crossing by the detected persons of a previously established virtual boundary.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/ realizing the teachings recited herein. In this particular example, computer system 104 represents an illustrative system for counting people using overhead camera view. It should be understood that any other computers implemented under the present invention may have different components/software, but will perform similar functions. As shown, computer system 104 includes a processing unit 106 capable of analyzing video surveillance, and producing a usable output, e.g., compressed video and video meta-data. Also shown is memory 108 for storing a counting program 124, a bus 110, and device interfaces 112.

Computer system 104 is shown communicating with one or more image capture devices 122 that communicate with bus 110 via device interfaces 112.

Processing unit 106 collects and routes signals representing outputs from image capture devices 122 to counting program 124. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different capture devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, image capture devices 122 are capable of two-way communication, and thus can receive signals (to power up, to sound an alert, etc.) from counting program 124.

In general, processing unit 106 executes computer program code, such as program code for executing counting program 124, which is stored in memory 108 and/or storage system 116. While executing computer program code, processing unit 106 can read and/or write data to/from memory 108 and storage system 116. Storage system 116 stores video metadata generated by processing unit 106, as well as rules and attributes against which the metadata is compared to identify objects and attributes of objects present within scan area (not shown). Storage system 116 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, but not limited to, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

Although not shown, computer system 104 could also include I/O interfaces that communicate with one or more external devices 118 that enable a user to interact with computer system 104 (e.g., a keyboard, a pointing device, a display, etc.).

Figure 2:
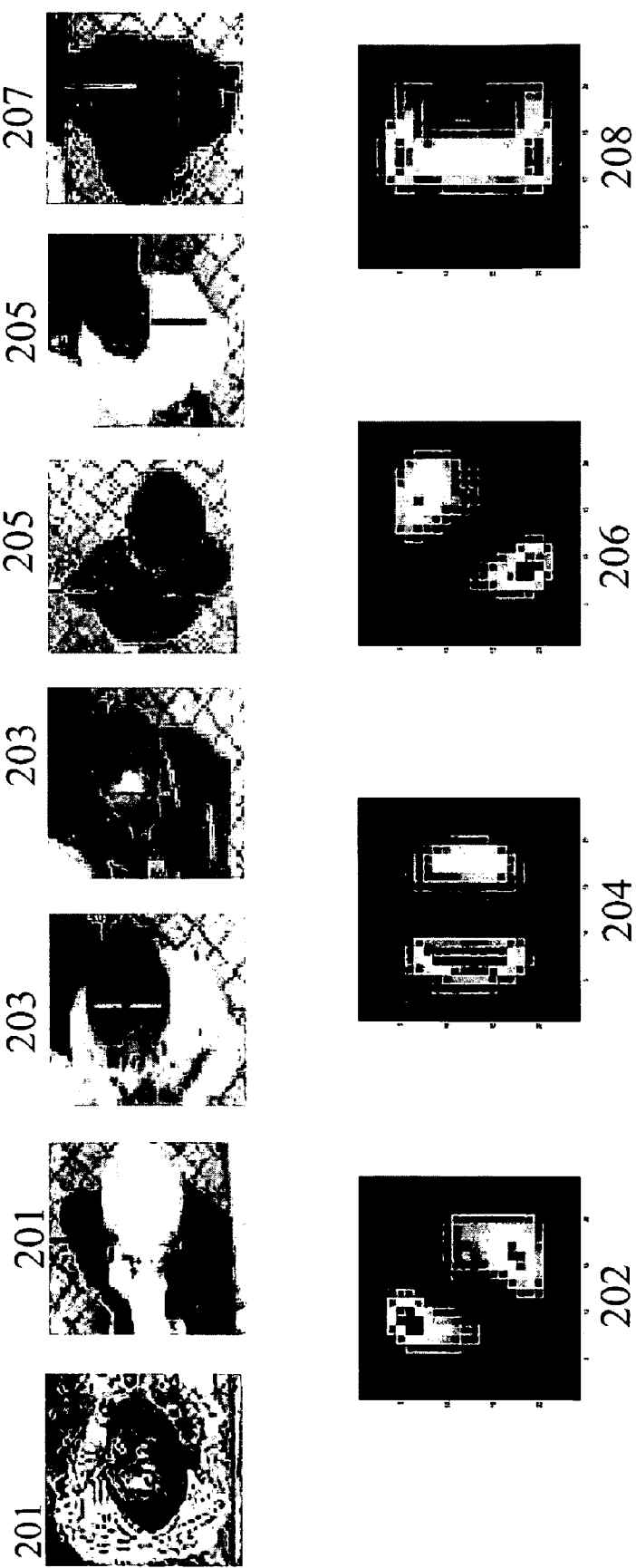
FIG. 2 depicts a process of generating a set of person-shaped models during training process.

FIG. 2 depicts a process of generating a set of person-shaped models during training process. As illustrated, tracked persons 201 produce person-shape model 202, tracked persons 203 produce person-shape model 204, tracked persons 205 produce person-shape model 206, and tracked person 207 produce person-shape model 208.

Figure 3:
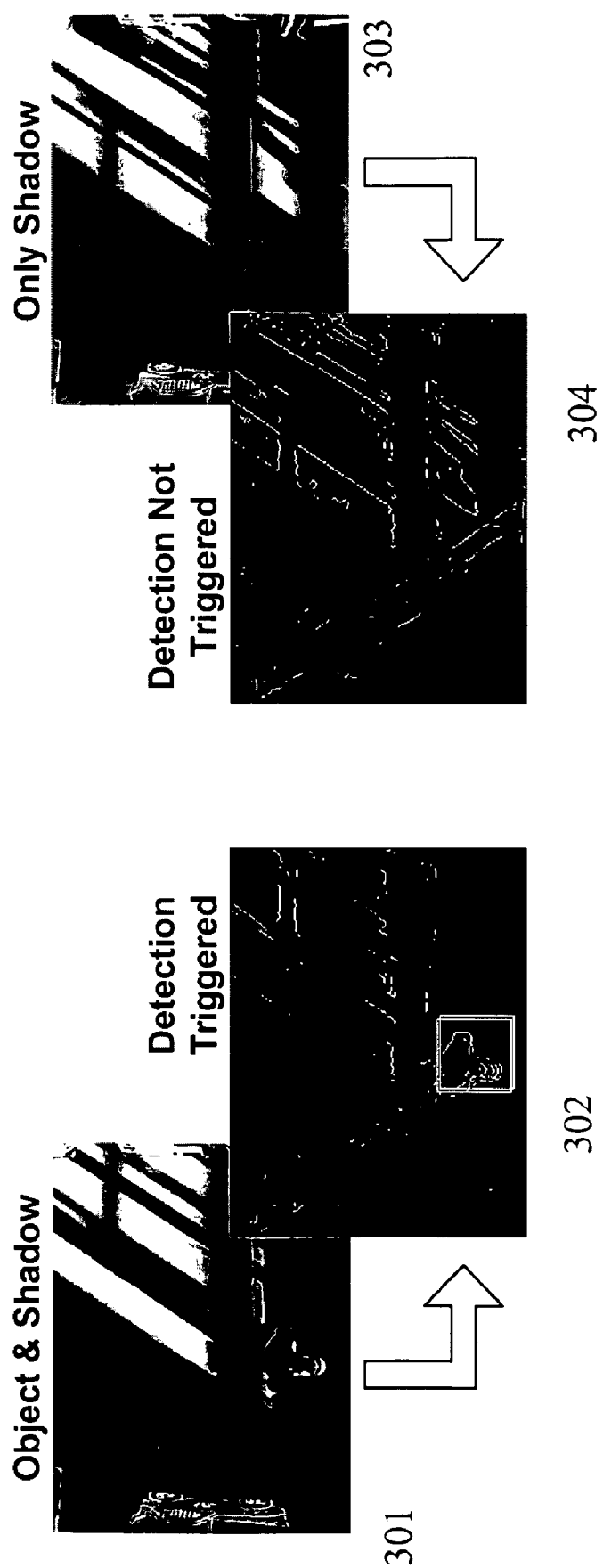
FIG. 3 illustrates selective triggering of detection.

FIG. 3 illustrates advantage of the current invention of selective triggering of detection. As illustrated, at 301 overhead camera view captures an object and its shadow. However, since the shadow doesn't match any person-shape model obtained during training, only object triggers detection at 302. To the contrary, as shown at 303, when only shadow is captured in overhead camera view, no detection is triggered at 304 thereby avoiding false increment of a counter (not shown).

Figure 4:
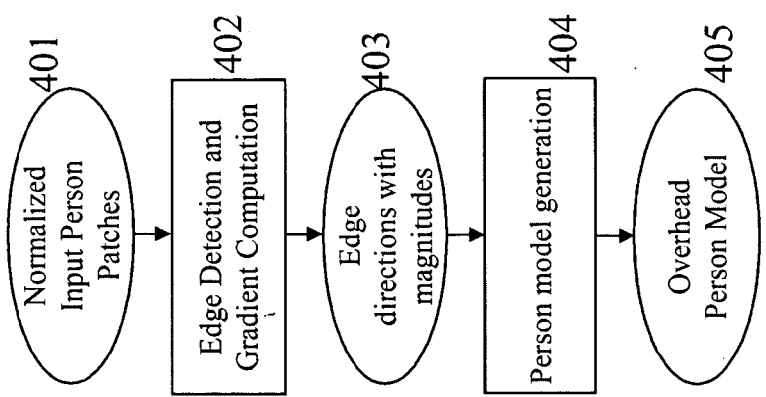
FIG. 4 depicts a block diagram of the training process.

FIG. 4 further illustrates the training process. As show, at 401 there is performed a normalized input person patches, resulting in edge detection and gradient computation at 402. Edge directions with magnitudes is performed at 403. At step 404 there is performed a person model generation, which results in overhead person-shape model creation at step 405.

Figure 5:
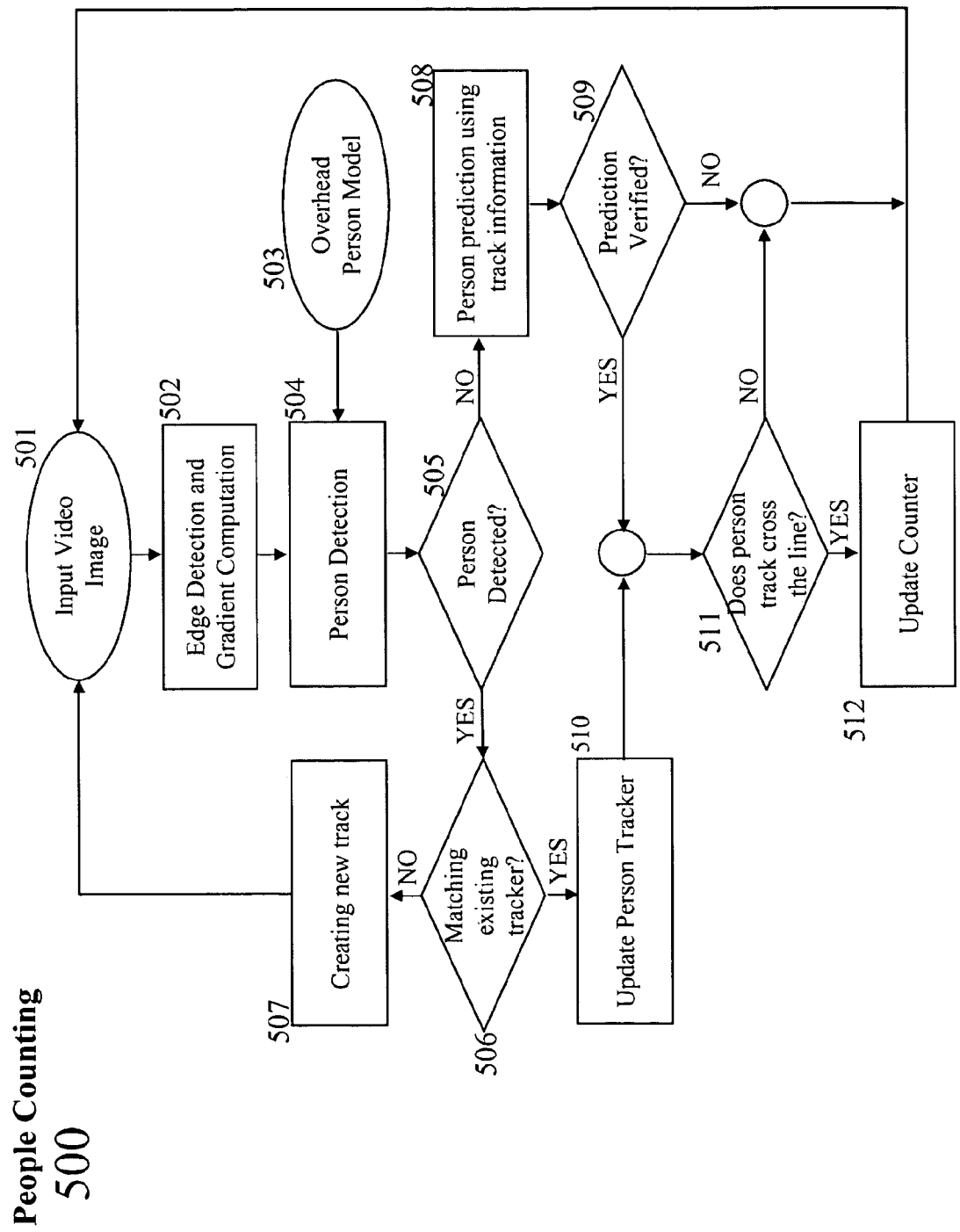
FIG. 5 illustrates the flow chart of the people counting process.

FIG. 5 depicts the flow chart of the process of people counting. Input video image 501 is analyzed for edge detection and immediately thereafter gradient computation is performed at step 502. At step 503 overhead person-shape model in matched for person detection at 504. At step 505 it is determined whether a person has been detected. If "yes", at step 506 it is matched against existing tracker and if there is a match, person tracker is updated at 510 and then at 511 the track of the person is analyzed to determine whether such track has crossed a previously established virtual boundary. The counter in incremented accordingly at 512 if such boundary was crossed.

If at step 506 there was no match for existing tracker, new track is created at 507 and new input video image is captured at 501. In case at step 505 it is determined that no person is detected, person prediction is performed in a larger area using track information. If such prediction is verified at 509, then the track is checked for crossing the virtual boundary at 511 and the counter is again incremented as needed at 512 if such virtual boundary was crossed.

Figure 6:
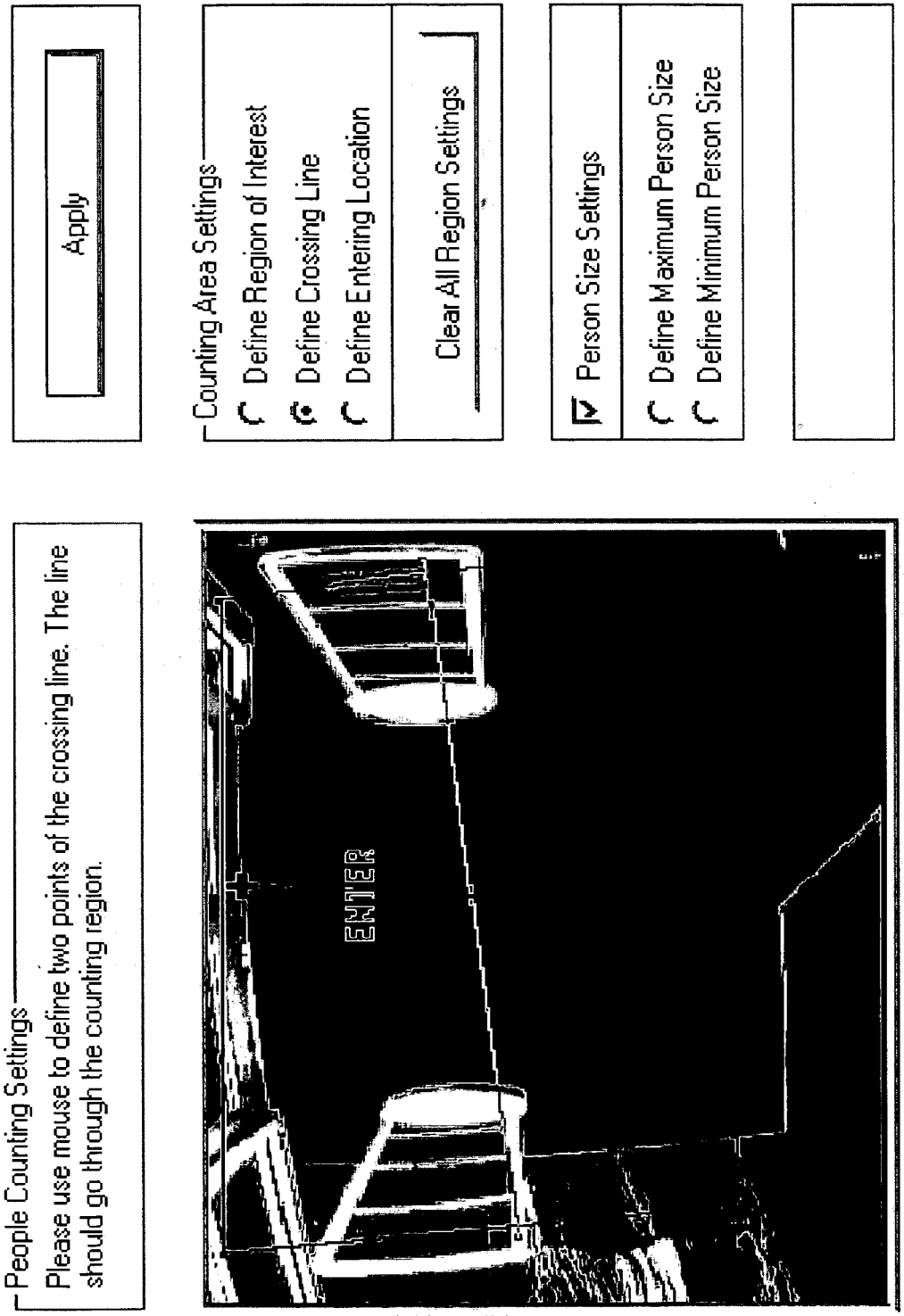
FIG. 6 provides an example of an interface for establishing of a virtual boundary.

FIG. 6 illustrates a sample interface for defining a virtual boundary for defining an area where such people counting is to be performed.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

What is claimed is:

1. A method for counting people using overhead camera views, said method comprising:
    generating a set of person-shape models during a cumulative training process, the set of person-shape models comprising a shape cue from an overhead view of a head and shoulder region of a human body;
    detecting persons in a camera field-of-view by using said set of person-shape models; and
    counting people by tracking detected persons upon crossing by said detected persons of a previously established virtual boundary.

2. The method according to claim 1, said generating a set of person-shape models further comprising:
    computing a quantized gradient map of an input image; and
    deriving a probabilistic map of gradient magnitude for each quantized gradient direction by accumulating person-shape models generated by said cumulative training process.

3. The method according to claim 1, said detecting persons in a camera field-of-view further comprising:
    constructing at least one gradient map consisting of a plurality of down-sampled input images and a plurality of up-sampled input images, and
    convolving a plurality of constructed gradient maps with said set of predetermined person-shape models.

4. The method according to claim 1, said counting people further comprising:
    predicting a position of a person in the next frame based on results of the current said person's detection and tracking;
    performing detection of said person in the spatial proximity of said predicted position;
    performing detection of said person in a broader region around said predicted position if no person is detected in said spatial proximity;
    updating tracking results by matching detected person with previously tracked persons; and
    increasing count upon crossing virtual boundary by said tracked person.

5. A system for counting people using overhead camera views, said system comprising:
    at least one processing unit;
    memory operably associated with the at least one processing unit;
    a generating tool storable in memory and executable by the at least one processing unit, said generating tool configured to generate a set of person-shape models comprising a shape cue from an overhead view of a head and shoulder region of a human body;
    a detecting tool storable in memory and executable by the at least one processing unit, said detecting tool configured to detect persons in a camera field-of-view by using said set of person-shape models, and
    a counting tool storable in memory and executable by the at least one processing unit, said counting tool configured to track detected persons upon crossing by said detected persons of a previously established virtual boundary.

6. The generating tool according to claim 5 further comprising:
    a computing component configured to compute a quantized gradient map of an input image; and
    a deriving component configured to derive a probabilistic map of gradient magnitudes for each quantized gradient direction by accumulating results obtained during the cumulative training process.

7. The detecting tool according to claim 5 further comprising:
    a constructing component configured to construct at least one gradient map consisting of a plurality of down-sampled input images and a plurality of up-sampled input images; and
    a convolving component configured to convolve a plurality of gradient maps with said set of predetermined person-shape models.

8. The counting tool according to claim 5, further comprising:
    a predicting component configured to predict a position of a person in the next frame based on results of the current said person's detection and tracking;
    a detecting component configured to perform detection of said person in the spatial proximity of said predicted position and in a broader region around said predicted position if no person is detected in said spatial proximity;
    an updating component configured to update tracking results by matching detected person with previously tracked persons; and
    a counting component configured to increase count upon crossing virtual boundary by said tracked person.

9. A computer-readable storage medium storing computer instructions, which when executed, enables a computer system to count people using overhead camera views, the computer instructions comprising:
    generating a set of person-shape models during a cumulative training process, the set of person-shape models comprising a shape cue from an overhead view of a head and shoulder region of a human body;
    detecting persons in a camera field-of-view by using said set of person-shape models; and
    counting people by tracking detected persons upon crossing by said detected persons of a previously established virtual boundary.

10. The computer-readable storage medium according to claim 9 further comprising computer instructions for:
    computing a quantized gradient map of an input image; and
    deriving a probabilistic map of gradient magnitude for each quantized gradient direction by accumulating person-shape models generated by said cumulative training process.

11. The computer-readable storage medium according to claim 9 further comprising computer instructions for:

constructing at least one gradient map consisting of a plurality of down-sampled input images and a plurality of up-sampled input images; and convolving a plurality of constructed gradient maps with said set of predetermined person-shape models.

12. The computer-readable storage medium according to claim 9 further comprising computer instructions for:

predicting a position of a person in the next frame based on results of the current said person's detection and tracking;

performing detection of said person in the spatial proximity of said predicted position;

performing detection of said person in a broader region around said predicted position if no person is detected in said spatial proximity;

updating tracking results by matching detected person with previously tracked persons; and increasing count upon crossing virtual boundary by said tracked person.

13. A method for deploying a counting tool for counting people using overhead camera views, said method comprising:

providing a computer infrastructure operable to:

generate a set of person-shape models comprising a shape cue from an overhead view of a head and shoulder region of a human body;

detect persons in a camera field-of-view by using said set of person-shape models; and count people by tracking detected persons upon crossing by said detected persons of a previously established virtual boundary.

14. The method according to claim 13, the computer infrastructure further operable to:

compute a quantized gradient map of an input image; and derive a probabilistic map of gradient magnitude for each quantized gradient direction by accumulating person-shape models generated by said cumulative training process.

15. The method according to claim 13, the computer infrastructure further operable to:

construct at least one gradient map consisting of a plurality of down-sampled input images and a plurality of up-sampled input images; and convolve a plurality of constructed gradient maps with said set of predetermined person-shape models.

16. The method according to claim 13, the computer infrastructure further operable to:

predict a position of a person in the next frame based on results of the current said person's detection and tracking;

perform detection of said person in the spatial proximity of said predicted position;

perform detection of said person in a broader region around said predicted position if no person is detected in said spatial proximity;

update tracking results by matching detected person with previously tracked persons; and increase count upon crossing virtual boundary by said tracked person.

* * * * *